Sept. 8, 1925
J. SOSS
FURNITURE LEG MOUNTING
Filed Oct. 24, 1923
1,552,890
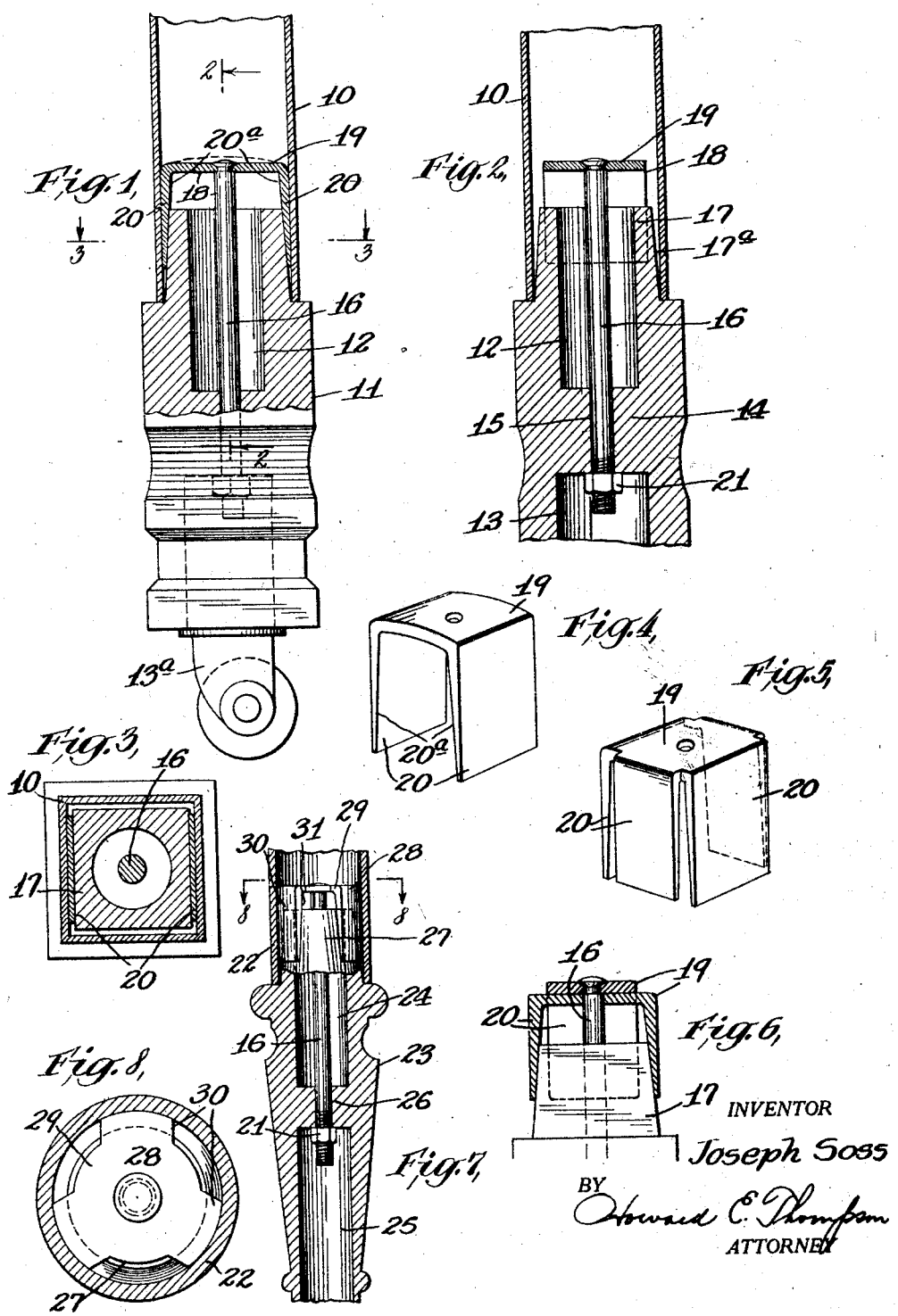
INVENTOR
Joseph Soss
BY
Howard E. Thompson
ATTORNEY Patented Sept. 8, 1925.

1,552,890

UNITED STATES PATENT OFFICE.

JOSEPH SOSS, OF BROOKLYN, NEW YORK.

FURNITURE-LEG MOUNTING.

Application filed October 24, 1923. Serial No. 670,395.

*To all whom it may concern:*

Be it known that I, JOSEPH SOSS, a citizen of the United States, and residing at Brooklyn, in the county of Kings and State of New York, have invented certain new and useful Improvements in Furniture-Leg Mountings, of which the following is a specification, such as will enable those skilled in the art to which it appertains to make and use the same.

This invention relates to the mounting of furniture legs in connection with the framework or structure of the furniture and particularly to the mounting of legs in connection with metal furniture, such as bedsteads, and the object of the invention is to provide a leg of simple construction and preferably composed of die-cast metal but which may be constructed in any desired manner and with means mounted in the leg and cooperating with the leg attaching part or member of a piece of furniture for firmly retaining and securing the leg in connection therewith and to provide a strong, durable and rigid coupling between the parts; a further object being to provide a lock member which cooperates with the leg and leg attaching part to lock the separate parts together with means whereby said lock member may be moved into an operative position; and with these and other objects in view the invention consists in a device of the class and for the purpose specified which is simple in construction and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a side and sectional view of a leg of a bedstead showing my improved method of mounting the same in position;

Fig. 2 is a section on the line 2—2 of Fig. 1;

Fig. 3 a section on the line 3—3 of Fig. 1;

Fig. 4 is a perspective detail view of the lock element which I employ in the construction shown in Figs. 1 to 3 inclusive;

Fig. 5 is a view similar to Fig. 4 of a modified form of lock element;

Fig. 6 is a view similar to Fig. 1 but showing only a part of the construction and illustrating the use of two lock elements similar to that shown in Figs. 1 to 4 inclusive;

Fig. 7 is a view similar to Fig. 1 but showing a modified form of construction; and, Fig. 8 is a section on the line 8—8 of Fig. 7 on an enlarged scale.

In Figs. 1 to 3 inclusive, I have shown at 10 a leg supporting part or member of a piece of furniture which is rectangular in form in cross section as shown in Fig. 3 of the drawing and which may constitute a part of a bedstead, and at 11 I have shown a leg member fashioned to give an ornamental appearance and to conform with the shape of the supporting member 10, the same being rectangular in form in cross section and being preferably made of die-cast metal but which may be made of any desired material or in any way. In the construction shown the leg member 11 is provided with top and bottom bores 12 and 13 and a central partition wall 14 having an aperture 15 through which a bolt 16 is adapted to pass. The bore 13 is adapted to receive and support a caster or the like 13ª as shown in Fig. 1 of the drawing.

The upper end portion 17 of the leg member 11 is reduced and tapered inwardly as shown at 17ª, said end portion being rectangular in form in cross section, and the side walls thereof tapering as described and the leg supporting part or member 10 is adapted to fit over the end portion 17 of the leg 11 as shown.

The bolt 16 constitutes a part of a retaining or locking device 18, the other part of said device comprising a U-shaped member 19 to the central cross head of which is mounted or secured the bolt 16, and the end portions 20 of the member 19 or the inner faces 20ª thereof are tapered to correspond with the taper 17ª on the extension of the leg member 11 as clearly shown in Fig. 1 of the drawing.

The bolt 16 of the lock device 18 normally protrudes through the aperture 15 into the bore 13 and a nut 21 is mounted on the threaded end of said bolt, and by rotating the nut by the use of a suitable wrench the U-shaped member 19 may be drawn downwardly to wedge the tapered end portions 20 of the member 19 between the protruding end portion 17 of the leg 11, and the walls of the supporting member 10 in which operation the straight outer faces of the end portions 20 of the member 19 are moved radially into firm engagement with the supporting member 10 throughout their entire length thus producing a strong, durable and rigid locking or coupling of the leg member 11 with the supporting member 10.

In Fig. 5 of the drawing I have shown a modification in which the member 19 is provided with four depending and tapered side members 20 instead of two as shown in Figs. 1 to 4 inclusive, and with this construction it will be apparent that the extensions 20 are moved outwardly and radially in coupling or locking the leg 11 with the attaching member 10. In Fig. 6 of the drawing, I have shown another form of construction in which two properly constructed lock members 19 are employed, both of which are U-shaped in form and similar to the member 19 shown in Figs. 1 to 4 inclusive. In this form of construction, these members are mounted one upon another with the extensions 20 at right angles to each other as will be apparent.

In Figs. 6 to 7 of the drawing, I have shown another method of carrying my invention into effect in which a leg supporting member 22 of circular formation, in cross section, is employed, and a leg member 23 which is cylindrical in form rather than rectangular in form and suitably fashioned to ornament the same, the leg member 23 being provided at its opposite ends with bores 24 and 25 divided by a partition wall 26 through which the bolt 16 passes, and the upper end of the leg member 23 is provided with a cylindrical tapered extension 27 instead of the rectangular tapered extension 17. With the construction shown in Figs. 7 and 8, a lock member 28 is mounted and secured upon the upper end of the bolt 16, said member comprising a top plate or cross head portion 29, and three depending extensions 30, the outer faces of which are straight and the inner faces 31 of which are tapered to correspond with the tapered extension 26.

The operation of the construction shown in Figs. 7 and 8 will be the same as that shown in Figs. 1 to 3 inclusive, it being understood that the lock members 19 and 28 operate to retain and lock the leg members in connection with the supporting members. It will be understood that while I have shown supporting members of specific construction and leg members of specific form and construction, I am not necessarily limited to the shape or form or construction of said members, nor to the coupling of metallic members of this kind together, nor am I necessarily limited to the specific form and construction of lock devices herein shown and described, and various changes therein and modifications thereof may be made, within the scope of the appended claims, without departing from the spirit of my invention or sacrificing its advantages.

It will be noted on a consideration of Figs. 1 and 4 of the drawing that the cross head portion of the member 19 is curved or bowed upwardly to a slight extent and in drawing the bolt 16 home this curvature is straightened or partially straightened as shown in Fig. 1 to firmly force the end portions 20 outwardly into engagement with the walls of the leg supporting part 10. If desired the end portions 20 of the member 19 after the leg 11 has been secured to the supporting member 10 as hereinbefore set out the member 19 may be permanently secured to the supporting member 10 by spot welding or otherwise, the spot welding passing through the walls of the supporting member 10 and the end portions 20 of the member 19 preferably adjacent to the cross head portion thereof, and the member 19 shown in Fig. 5 of the drawing as well as the member 28 may also be secured to the leg supporting member employed in a similar manner, especially when said leg supporting member is composed of metal. In the event of the securing of the members 19 or 28 to the leg supporting member, the leg which is employed may be removed by simply removing the nut 21 from the bolt 16, and said leg may be replaced at will.

Having fully described my invention, what I claim as new and desire to secure by Letters Patent, is;—

1. A device of the class described comprising a bolt, a lock element mounted in connection with one end portion of said bolt, said lock element comprising a cross head and members extending from said cross head at an angle thereto and the cross head of said lock element being bowed.

2. A furniture leg mounting of the class described comprising a suitably fashioned leg member provided at one end with a tapered extension adapted to be inserted into the leg supporting member of a piece of furniture, a lock device for coupling said leg with said supporting member comprising a part having tapered members adapted to cooperate with the tapered extension of said leg, and a part fixedly attached to said first named part and extending through said leg for moving the first named part into a position to rigidly retain the leg supporting member and said first named part being adapted to be secured to the leg supporting member.

3. A furniture leg mounting of the class described comprising a suitably fashioned leg member provided at one end with a tapered extension adapted to be inserted into the leg supporting member of a piece of furniture and to project therefrom, a bolt mounted in connection with said leg member and extending into said leg supporting member, a lock device fixedly mounted in connection with the inner end of said bolt and comprising a crosshead, and integral depending members adapted to cooperate with the tapered extension of said leg member and the surrounding walls of the supporting member for coupling said parts together.

4. A furniture leg mounting of the class described comprising a suitably fashioned leg member provided at one end with a tapered extension adapted to be inserted into the leg supporting member of a piece of furniture and to project therefrom, a bolt mounted in connection with said leg member and extending into said leg supporting member, a lock device mounted in connection with the inner end of said bolt and comprising a crosshead, integral depending members adapted to cooperate with the tapered extension of said leg member and the surrounding walls of the supporting member for coupling said parts together, and said crosshead being bowed upwardly.

In testimony that I claim the foregoing as my invention I have signed my name this 23rd day of October, 1923.

JOSEPH SOSS.